(12) United States Patent
Hebert et al.

(10) Patent No.: US 9,816,809 B2
(45) Date of Patent: Nov. 14, 2017

(54) 3-D SCANNING AND POSITIONING SYSTEM

(71) Applicant: CREAFORM INC., Lévis (CA)

(72) Inventors: Patrick Hebert, Québec (CA); Félix Rochette, Québec (CA)

(73) Assignee: CREAFORM INC., Levis (CA)

( * ) Notice: Subject to any disclaimer, the term of this patent is extended or adjusted under 35 U.S.C. 154(b) by 363 days.

(21) Appl. No.: 14/405,428

(22) PCT Filed: Jun. 26, 2013

(86) PCT No.: PCT/IB2013/055256
§ 371 (c)(1),
(2) Date: Dec. 4, 2014

(87) PCT Pub. No.: WO2014/006545
PCT Pub. Date: Jan. 9, 2014

(65) Prior Publication Data
US 2015/0138349 A1    May 21, 2015

Related U.S. Application Data (60) Provisional application No. 61/667,974, filed on Jul. 4, 2012.

(51) Int. Cl.
*H04N 5/225* (2006.01)
*G01B 11/25* (2006.01)
*G01B 11/00* (2006.01)

(52) U.S. Cl.
CPC ............ *G01B 11/25* (2013.01); *G01B 11/002* (2013.01); *G01B 11/2513* (2013.01); *H04N 5/2256* (2013.01)

(58) Field of Classification Search
CPC ..... G01B 11/25; G01B 11/002; H04N 5/2256
See application file for complete search history.

(56) References Cited

U.S. PATENT DOCUMENTS 5,561,526 A * 10/1996 Huber ............... G01B 11/2504
348/E13.005
6,137,491 A    10/2000 Szeliski
(Continued)

FOREIGN PATENT DOCUMENTS

CA    2256587        12/1997
CA    2656163 A1    9/2006
(Continued)

OTHER PUBLICATIONS

Newcombe et al., "KinectFusion: Real-Time Dense Surface Mapping and Tracking", 2011 10th IEEE International Symposium on Mixed and Augmented Reality (ISMAR), Oct. 26-29, 2011, pp. 127-136, IEEE, Basel.
(Continued)

*Primary Examiner* — Tung Vo
(74) *Attorney, Agent, or Firm* — Fasken Martineau Dumoulin LLP (57) ABSTRACT

A system for obtaining three-dimensional information about a surface, the system comprising: a sensing device having: a pattern projector for providing a projected pattern on the surface; and a camera for acquiring a 2D image of the surface from a viewpoint, wherein at least one target of a set of reference targets and at least a portion of the projected pattern is apparent on the 2D image; a storage for calibration data; an image processor for extracting 2D image coordinates of surface points of the projected pattern and target contours from the 2D image; a 3D surface point calculator for calculating 3D coordinates of the surface points from the 2D image coordinates of the surface points; a 3D target calculator for calculating a 3D position and/or an actual orientation for the reference target.

20 Claims, 7 Drawing Sheets

(56) References Cited

U.S. PATENT DOCUMENTS

| | | | |
|---|---|---|---|
| 6,922,632 | B2 | 7/2005 | Foxlin |
| 6,985,238 | B2 | 1/2006 | Isaacs et al. |
| 7,768,656 | B2 | 8/2010 | Lapa et al. |
| 7,912,673 | B2 | 3/2011 | Hébert et al. |
| 8,032,327 | B2 | 10/2011 | Hebert et al. |
| 8,082,120 | B2 | 12/2011 | St-Pierre et al. |
| 8,090,194 | B2 | 1/2012 | Golrdon et al. |
| 8,121,399 | B2 | 2/2012 | Hayashi et al. |
| 8,662,676 | B1* | 3/2014 | Chang ............... H04N 17/002 345/158 |
| 8,791,997 | B2* | 7/2014 | Munkelt ............. G01B 11/245 348/135 |
| 9,325,973 | B1* | 4/2016 | Hazeghi ........... G01B 11/2513 |
| 9,338,447 | B1* | 5/2016 | Crump ..................... G06T 7/80 |
| 2003/0234941 | A1 | 12/2003 | Mundy et al. |
| 2004/0057057 | A1 | 3/2004 | Isaacs et al. |
| 2006/0062449 | A1* | 3/2006 | Pratt ..................... A61B 5/107 382/154 |
| 2007/0103646 | A1 | 5/2007 | Young |
| 2008/0075324 | A1 | 3/2008 | Sato et al. |
| 2008/0201101 | A1 | 8/2008 | Hebert et al. |
| 2008/0285843 | A1* | 11/2008 | Lim ..................... G06K 9/2036 382/154 |
| 2009/0097039 | A1 | 4/2009 | Kawasaki et al. |
| 2009/0205088 | A1* | 8/2009 | Crampton .......... G01B 11/2518 850/21 |
| 2009/0238449 | A1* | 9/2009 | Zhang .................... G06T 7/521 382/165 |
| 2010/0046801 | A1 | 2/2010 | Ishiyama |
| 2011/0134225 | A1* | 6/2011 | Saint-Pierre .......... G01B 11/03 348/47 |
| 2011/0205338 | A1 | 8/2011 | Choi et al. |
| 2012/0099798 | A1 | 4/2012 | Saruta et al. |

FOREIGN PATENT DOCUMENTS

| | | |
|---|---|---|
| CN | 101026776 A | 8/2007 |
| CN | 101089551 A | 12/2007 |
| CN | 101292131 A | 10/2008 |
| CN | 101611291 A | 12/2009 |
| CN | 102042814 A | 5/2011 |
| CN | 102175182 A | 9/2011 |
| CN | 102263920 A | 11/2011 |
| CN | 102338616 A | 2/2012 |
| CN | 101620676 B | 5/2012 |
| JP | H08136220 A | 5/1996 |
| JP | H1021401 A | 1/1998 |
| JP | 2000175176 A | 6/2000 |
| JP | 2002521683 A | 7/2002 |
| JP | 2009283917 A | 12/2009 |
| JP | 2012026974 A | 2/2012 |
| WO | 99/60525 A1 | 11/1999 |
| WO | 2012168904 A2 | 12/2012 |

OTHER PUBLICATIONS

Choi et al, "Voting-based pose estimation for robotic assembly using a 3D sensor", 2012 IEEE International Conference on Robotics and Automation (ICRA), May 14-18, 2012, pp. 1724-1731, IEEE, Saint Paul, MN.

Guehring, "Reliable 3D surface acquisition, registration and validation using statistical error models", Third International Conference on 3-D Digital Imaging and Modeling, May 28, 2001-Jun. 1, pp. 224-231, IEEE, Quebec City.

Blais, "A Review of 20 Years of Range Sensor Development", Journal of Electronic Imaging, Jan. 2004, pp. 231-243, vol. 13 (1), NRC.

Zhang et al., "Rapid Shape Acquisition Using Color Structured Light and Multi-pass Dynamic Programming", pp. 1-13. Available on the internet at http://grail.cs.washington.edu/projects/moscan/paper.pdf on Nov. 23, 2012.

Vuylsteke et al., "Range Image Acquisition with a Single Binary-Encoded Light Pattern", IEEE Transaction on Pattern Analysis and Marchine Intelligence, Feb. 1990, pp. 148-164, vol. 12, No. 2.

Heikkilä, "Geometric camera calibration using circular control points", Pattern Analysis and Machine Intelligence, IEEE Transactions on, Oct. 2000, pp. 1066-1077, vol. 22, No. 10.

Ouellet et al., "Geometric Calibration of a Structured Light System Using Circular Control Points", in Proceedings of the Fourth 3D Data Processing, Visualization and Transmission, Jun. 2008, pp. 1-8, Proceedings of 3DPVT, Atlanta, GA, USA.

Salvi et al,"Pattern Codification Strategies in Structured Light Systems", Pattern Recognition, 2004, pp. 827-849, vol. 37 Elsevier Ltd.

Trucco et al., "Introductory Techniques for 3-D Computer Vision", Chapter 11, 1998, pp. 292-293, Prentice Hall, United States.

Gelfand et al., "Geometrically Stable Sampling for the ICP Algorithm", Fourth International Conference on 3D Digital Imaging and Modeling, Oct. 6-10, 2003, 9 pages, Stanford University, USA.

Gelfand et al., "Shape Segmentation Usign Local Slippage Analysis", Eurographics Symposium on Geometry Processing, 2004, 10 pages, The Eurographics Association 2004, USA.

Hebert, "A Self-Referenced Hand-Held Range Sensor", Third International Conference on 3 D Digital Imaging and Modeling, May 28-Jun. 1, 2001, pp. 5-12, IEEE, Canada.

Guehring, "Reliable 3D surface acquisition, registration and validation using statistical error models", Third International Conference on 3 D Digital Imaging and Modeling, May 28-Jun. 1, 2001, pp. 224-231, IEEE, Canada.

Hara et al., Method to Determine Likelihood Distribution based on the Shape of Scan Points in Localization with Scan Matching, Proceedings of the 2009 JSME Conference on Robotics and Mechatronics, May 24-26, 2009, 12 pages, The Japan Society of Mechanical Engineers, Japan.

* cited by examiner

3-D SCANNING AND POSITIONING SYSTEM

TECHNICAL FIELD

The present invention generally relates to the field of three-dimensional scanning of the surface geometry of an object, and, more particularly, to structured light stereoscopy.

BACKGROUND OF THE ART

Three-dimensional scanning and digitization of the surface geometry of objects is commonly used in many industries and services, and their applications are numerous. The shape of an object is scanned and digitized using a ranging sensor that measures the distance between the sensor and a set of points on the surface. The sensor captures a section of the object's surface from a given viewpoint. To extend the scanned section or to scan the whole surface, the sensor, or the object, is moved to one of several viewpoints and the spatial relationship between all the relative poses between the sensor and the object is obtained. Several approaches exist for measuring and calculating these spatial relationships. One of these approaches exploits targets, such as retro-reflective targets. The system of U.S. Pat. No. 7,912,673 concurrently measures the surface shape of the object after projecting a pattern of structured light while observing retro-reflective targets using at least a pair of cameras. The system builds a model of the surface geometry while it accumulates a model of the 3-D positions of the targets in a single model coordinate system simultaneously. It would be useful to simplify the modeling system to allow operation with a single camera while retaining most functionalities of the full system.

SUMMARY

According to one broad aspect of the present invention, it is possible to capture the 3D positions, and optionally orientations, of the reference targets on a surface from a single viewpoint while capturing 3D surface points in the full field, using a single camera along with a projector.

According to another broad aspect of the present invention, there is provided a system with a camera, a projector and a light source which captures the 3D surface and the 3D position of retro-reflective targets simultaneously.

In one embodiment, this system is used to acquire the 3D model of the surface of an object by integrating the 3D points in each frame as well as the target model.

In one embodiment, this system is used in real time, namely it is a one shot system, allowing motion during acquisition.

According to another broad aspect of the present invention, there is provided a system for obtaining three-dimensional information about a surface having a set of at least one reference target each provided at a fixed position one of near and on the object, the system comprising: a sensing device having: a pattern projector for providing a projected pattern on the surface; and a camera for acquiring a 2D image of the surface from a viewpoint, the camera cooperating with the pattern projector, wherein at least one target of the set of reference targets and at least a portion of the projected pattern is apparent on the 2D image; a storage for calibration data, the calibration data including extrinsic and intrinsic parameters of the camera and the pattern projector; an image processor for extracting 2D image coordinates of surface points of the projected pattern and target contours from the 2D image; a 3D surface point calculator for calculating 3D coordinates of the surface points from the 2D image coordinates of the surface points using the calibration data; a 3D target calculator for calculating, from the 2D image coordinates of the target contours, using the 3D coordinates of the surface points and the calibration data, at least one of a 3D position and an actual orientation for the reference target.

In one embodiment, the reference target is a retro-reflective target, wherein the sensing device further comprises a light source for illuminating the surface, the camera cooperating with the light source.

In one embodiment, the light source is a ring light source surrounding the camera.

In one embodiment, the ring light source has at least two Light Emitting Diodes (LED).

In one embodiment, the pattern projector is one of a laser pattern projector and a wideband pattern projector.

In one embodiment, the pattern projector and the camera are synchronized to simultaneously provide the projected pattern and acquire the 2D image by the camera.

In one embodiment, the system further comprises a target model storage for storing a model of targets of the surface; a target matcher for matching the target with a same target in the model of targets and generating a rigid transformation mapping a coordinate system of the sensing device to a coordinate system of the target model.

In one embodiment, the system further comprises a target transformer for transforming the 3D position for the reference target into a transformed 3D position for the reference target using the rigid transformation; a target model builder for updating the model of targets in the target model storage using the transformed 3D position for the reference target.

In one embodiment, the system further comprises a surface point transformer for transforming the 3D coordinates of the surface points into transformed 3D coordinates of the surface points using the rigid transformation; a surface reconstructor for producing a surface model of the surface using the transformed 3D coordinates of the surface points.

In one embodiment, the system further comprises a user interface display for displaying at least one of the surface model of the surface and the model of targets.

In one embodiment, the sensing device is adapted to be displaced to a plurality of distinct viewpoints and wherein the camera acquires the 2D image at each viewpoint of the plurality of viewpoints and wherein the 3D surface point calculator and the 3D target calculator use 2D image coordinates from at least two of the 2D images.

In one embodiment, the camera acquires at least two of the 2D image at the viewpoint and wherein the 3D surface point calculator and the 3D target calculator use 2D image coordinates from at least two of the 2D images.

In one embodiment, the sensing device is adapted to be displaced to a plurality of distinct viewpoints and wherein the camera acquires at least two of the 2D image at each viewpoint of the plurality of viewpoints and wherein the 3D surface point calculator and the 3D target calculator use 2D image coordinates from at least two of the 2D image.

In one embodiment, the camera is a first camera and wherein the 2D image is a first 2D image; and wherein the sensing device further comprises a second camera for acquiring a second 2D image of the surface, the second camera cooperating with the first camera, a spatial relationship between the first camera and the second camera being known, wherein the calibration data includes extrinsic and intrinsic parameters of the second camera.

In one embodiment, the sensing device further comprises a synchronizing unit in communication with the first camera, the second camera and the pattern projector, the synchronizing unit controlling the first camera and the pattern projector to capture the first 2D image during a first time interval and controlling the second camera and the pattern projector to capture the second 2D image during a second time interval; wherein the first time interval is distinct from the second time interval.

In one embodiment, the synchronizing unit controls the pattern projector to provide the projected pattern during the first time interval and prevents the pattern projector from providing the projected pattern during the second time interval.

In one embodiment, the second camera is a texture camera, the second 2D image being a 2D texture image of the surface, the system further comprising a texture extractor for extracting a texture of the surface at the 2D image coordinates of surface points to obtain texture information for the surface point.

According to another broad aspect of the present invention, there is provided a system for obtaining three-dimensional information about a surface, the system comprising: a sensing device having: a pattern projector for providing a projected pattern on the surface; and a camera for acquiring a 2D image of the surface from a viewpoint, wherein at least one target of a set of reference targets and at least a portion of the projected pattern is apparent on the 2D image; a storage for calibration data; an image processor for extracting 2D image coordinates of surface points of the projected pattern and target contours from the 2D image; a 3D surface point calculator for calculating 3D coordinates of the surface points from the 2D image coordinates of the surface points; a 3D target calculator for calculating a 3D position and/or an actual orientation for the reference target.

According to another broad aspect of the present invention, there is provided a method for extracting a 3D position for a target affixed on a surface, a pattern being projected on the surface. The method comprises retrieving target information, the target information including a target size; retrieving calibration data, the calibration data including extrinsic and intrinsic parameters; providing a 2D image of the surface, wherein the target and at least a portion of the projected pattern being apparent on the 2D image; extracting 2D image coordinates of target contours of the target from the 2D image; calculating at least one possible orientation for the target using the 2D image coordinates of target contours and the calibration data; estimating an estimated 3D position for the target using the 2D image coordinates of the target contours, the calibration data and the target size; extracting 2D image coordinates of surface points of the projected pattern from the 2D image; identifying neighboring surface points located around the target and calculating 3D coordinates of the neighboring surface points from the 2D image coordinates of the surface points using the calibration data and the 2D image coordinates of the target contours; fitting a surface section model on the 3D coordinates of the neighboring surface points using the 2D image coordinates of the target contours; using the fitted surface section model, the 2D image coordinates of target contours and the at least one possible orientation, at least one of refining the estimated 3D position into a refined 3D position and identifying an actual orientation for the target.

In one embodiment, the target information includes a target thickness; refining the estimated 3D position includes using the target thickness for the refining.

BRIEF DESCRIPTION OF THE DRAWINGS

The accompanying drawings, which are included to provide a better understanding of the main aspects of the invention and are incorporated in and constitute a part of this specification, illustrate example embodiments of the invention and together with the description serve to explain the principles of the invention. The accompanying drawings are not intended to be drawn to scale. In the drawings.

It will be noted that throughout the appended drawings, like features are identified by like reference numerals.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
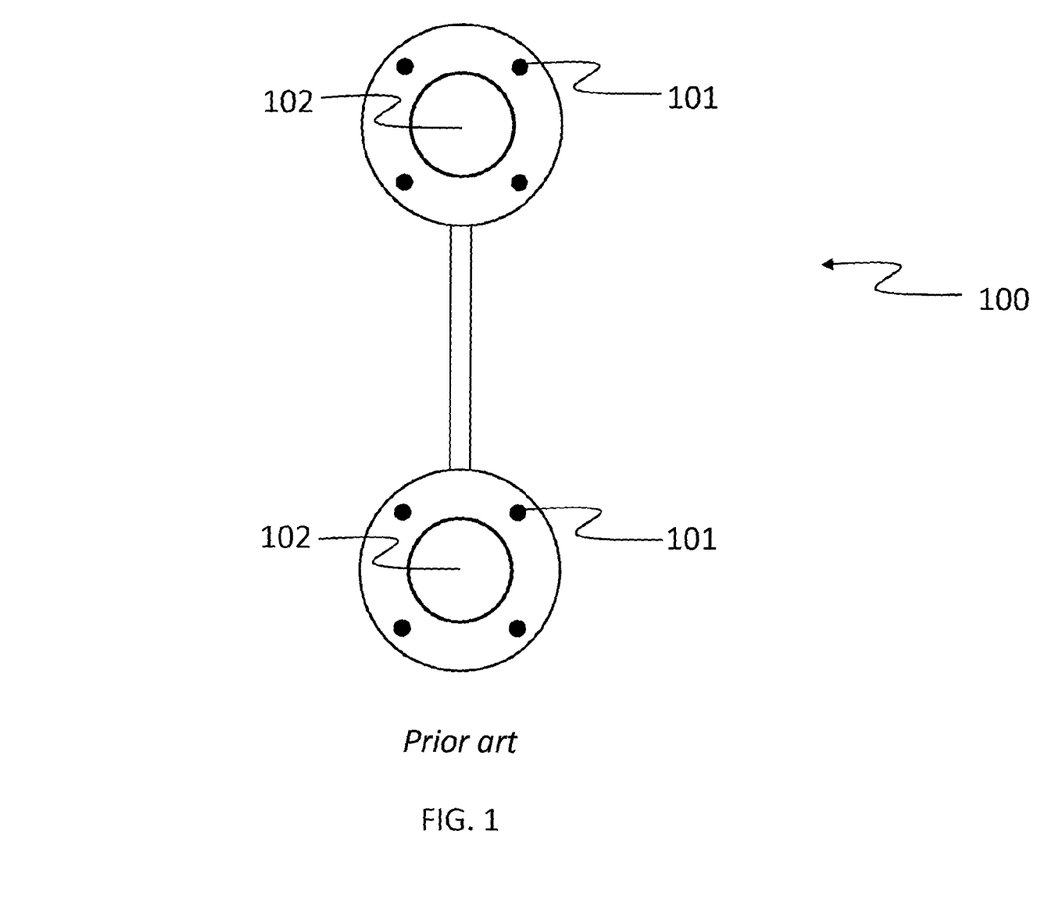
FIG. 1 (Prior art) is an illustration of a stereo pair including two cameras with ring lights.

FIG. 1 (prior art) illustrates a stereo pair 100 with two cameras 102 and two ring lights 101. If retroreflective targets have been affixed to a scene, use of the prior art stereo pair 100 allows to simultaneously capture two images of the scene and to extract the 3D positions of the retroreflective targets. After image processing, the 2D positions, and optionally the orientations, of these reference targets are obtained in each image. Then one typically exploits epipolar geometry constraints to match the 2D extracted targets in both images before applying triangulation to extract the 3D coordinates of the reference targets in the stereo pair coordinate system. One can add one or several cameras to this prior art stereo pair, to facilitate matching or improve precision of the final coordinates. Using a single camera instead of both cameras of the prior art stereo pair would require moving the camera to at least one additional viewpoint to re-observe the same reference targets before calculating their 3D positions. One can also add a pattern projector to the prior art stereo pair to project a pattern including at least a line to exploit the same cameras for extracting 3D surface points in the scene where the pattern reflects on the surface. The pattern can be a laser pattern. This principle was used in U.S. Pat. No. 7,912,673 for interactive modeling while the system concurrently builds a reference target model along with the 3D surface model of an observed object.

In order to measure the surface points with a prior art method, one can also use a full-field pattern projector along with a camera. 3D surface points can be extracted all over the whole field of view where the projector projects light on the surface. The density of extracted surface points will vary depending on the type of projector and the method that is applied. Some well known methods based on temporal coding involve the projection of a set of images in time to decode image points before applying triangulation. The role of the projector is to help match points between the projector and the camera pixels. Gray code and phase-shift methods are examples of such methods. There are numerous possible variations; it is even possible to exploit multispectral projection into a single or a few frames to reduce the capture time. Another approach to reducing the capture time to a single frame exploits a spatial code to help matching. The projected pattern locally encodes a unique position. The usage of spatio-temporal codes is another variation that combines both types of code: spatial and temporal codes. Reducing the number of captured images to a single image allows sensor or object motion during the capture 3D surface points. These systems are referred to as snapshot systems.

The present invention makes it possible to capture the 3D positions, and orientations, of the reference targets from a single viewpoint while capturing 3D surface points in the full field, using a single camera along with a projector.

Figure 2:
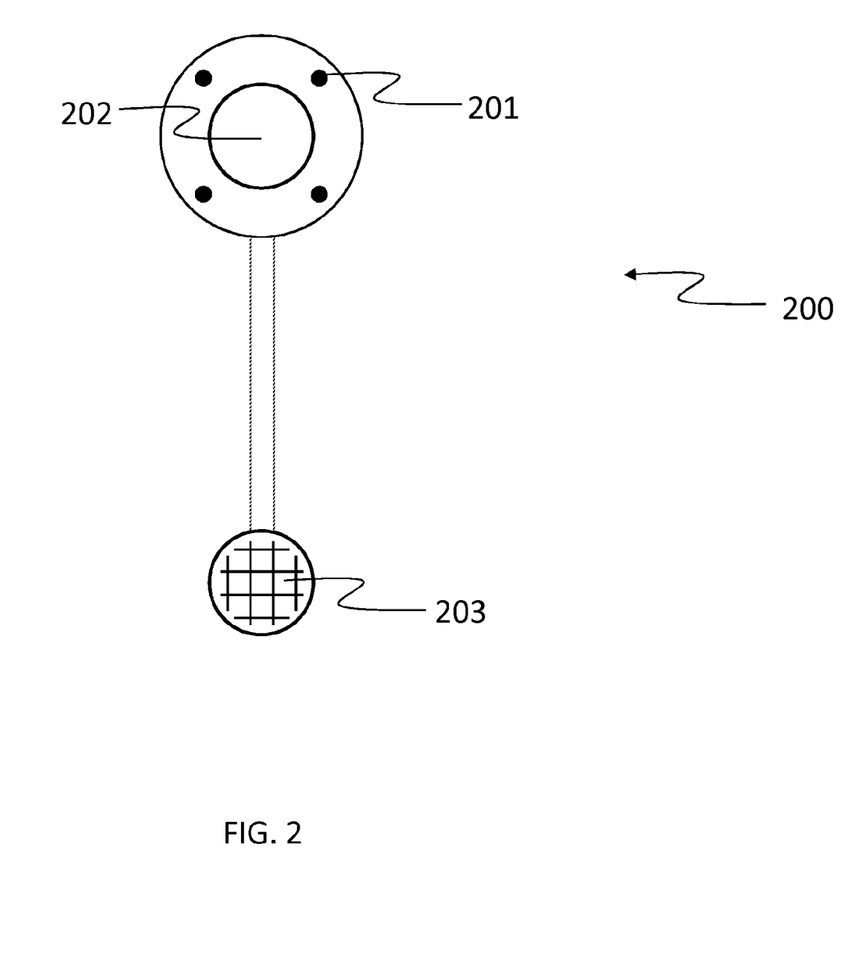
FIG. 2 is an illustration of a stereo pair including one camera with a ring light and a projector.

A representation of an example sensor 200 (also referred to as "sensing device") is depicted in FIG. 2 where one camera 202 along with a ring light 201 are mounted at one extremity of the device while a full-field projector 203 is mounted at the other extremity. The full-field projector 203 can be a laser pattern projector or a wideband pattern projector such as a white light pattern projector. Other types of projectors can also be used, such as an infrared pattern projector or a blue LED pattern projector.

The full-field projector 203 can be synchronized with camera 202 to project the pattern at the same time as the capture of the image. Alternatively, the full-field projector can be activated to provide the pattern on the surface of the object continuously without synchronization with the camera 202. In all cases, at least a portion of the pattern should be apparent on the image captured by the camera.

Figure 3:
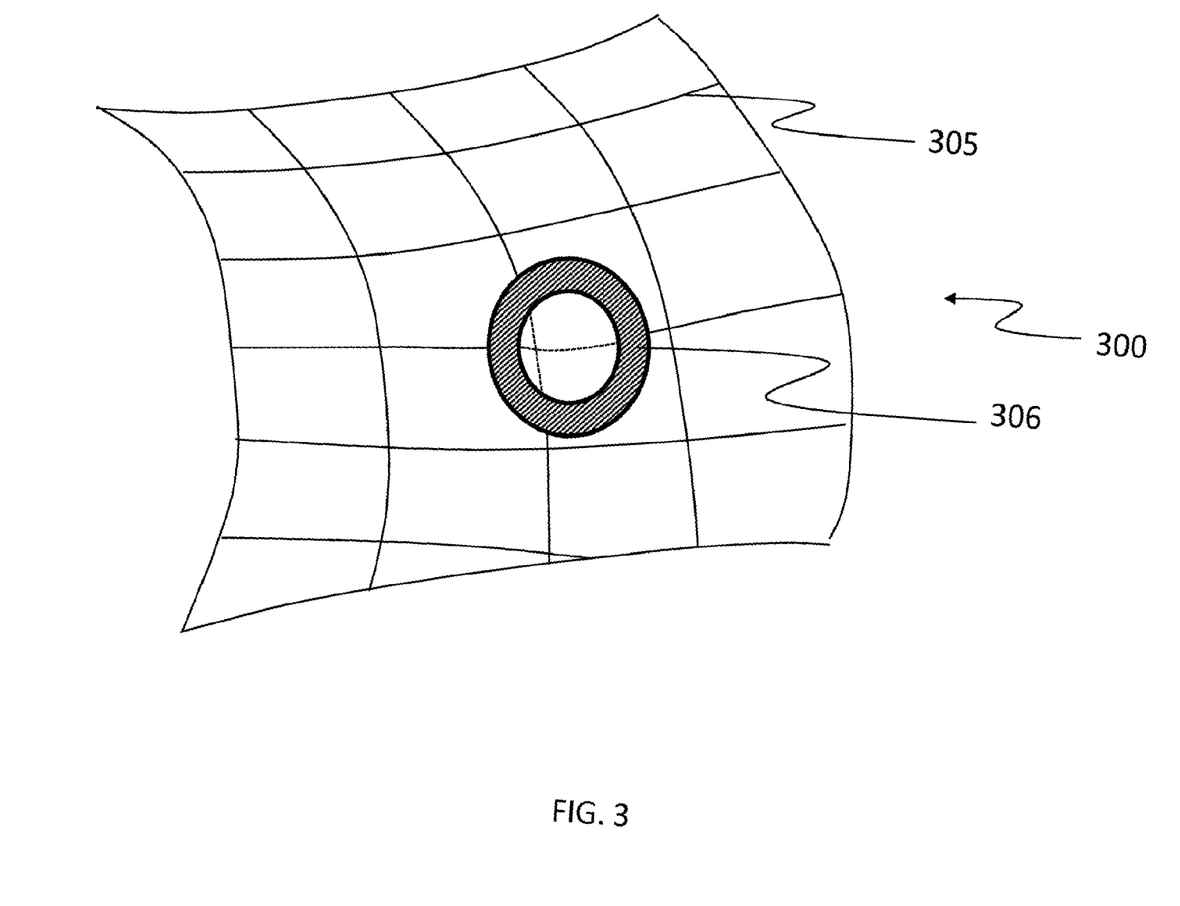
FIG. 3 illustrates a grid pattern projected onto a surface of an object with a reference target.

FIG. 3 shows a representation 300 of a surface section on which a reference target 306 is affixed and onto which a pattern 305 is projected. In this example, the reference target 306 is a retro-reflective target. The pattern is visible on the surface of the object as well as on the retro-reflective material. In this example, the retro-reflective material is circumscribed by an annulus of a solid color, such as black. The black annulus helps identifying the target in the sensor's image. The annulus is useful but can be omitted. The ring light level can be adjusted so as to slightly saturate the image which also helps identifying the target in the sensor's image.

As will be readily understood, the light source is synchronized with the camera and provided in its near vicinity to ensure that the retro-reflective material of the reference target 306 reflects the light source light when the image is captured by the camera thereby allowing the reference target 306 to be apparent in the image.

The reference target 306 can be on the surface of the object and/or on the surface of the environment near the object if the object is not moved in its environment during capture of the images. The reference target 306 can be a photogrammetric target, a retro-reflective target, a coded target, a circular target, a simply reflective target, a drawn mark and a distinctive shape feature. If the reference target 306 is made of a reflective material, the surface of the object may need to be illuminated to allow proper identification of the reference target.

Figure 4:
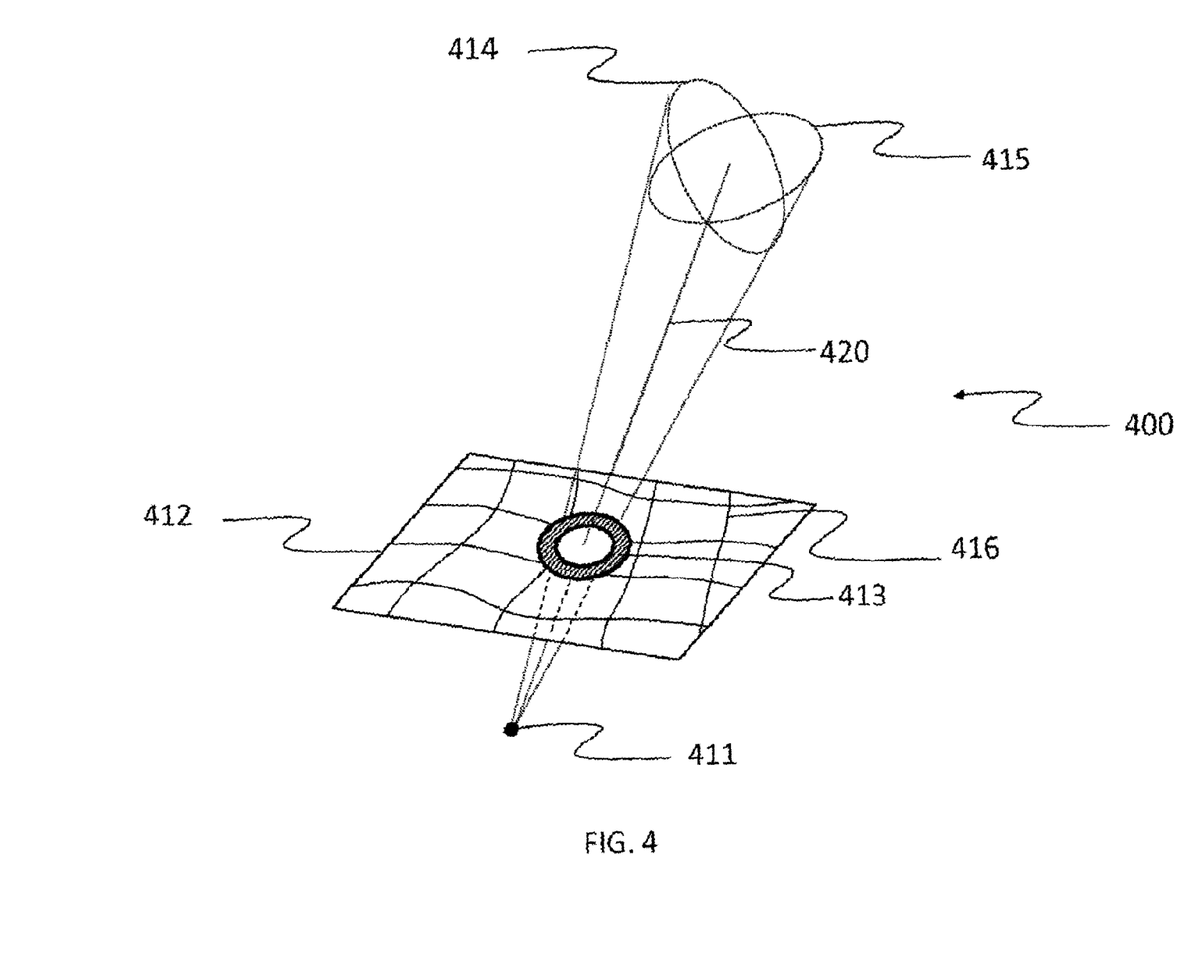
FIG. 4 illustrates an image of the reference target and the grid pattern along with two solutions of the backprojection of the reference target in 3D space.

In FIG. 4, the result 400 of calculating the position and orientation of a reference target from a single view camera is shown. The image plane 412 of the camera and the center of projection 411 are shown. The image plane 412 shows the image of the observed surface with the projected pattern 416 and the reference target 413. If the target is circular, such as in this example, an ellipse contour is obtained after extracting the undistorted contour of the projected retro-reflective target in the image. Since the camera is calibrated, distortion can be removed using methods well known in the art. An example is found in "Geometric camera calibration using circular control points" by J. Heikkila in IEEE transactions on Pattern analysis and machine intelligence, Vol. 22 no. 10, October 2000, pp. 1066-1077.

From the equation of the ellipse contour in the image, it is possible to calculate its orientation in 3D space. Two solutions 414, 415 for the target normal vector are possible. Ray 420 originates from the center of projection 411 of the camera and passes through the center of the solutions 414, 415. One method for calculating these two solutions for the normal vector orientation follows. One can refer to "Introductory techniques for 3-D computer vision", Chap. 11, E. Trucco, A. Verri, Prentice Hall, 1998 for a more detailed discussion. Since the circle projects to the center of projection of the camera, it intersects a cone in 3D space whose equation is given by:

$$aX^2 + bXY + cY^2 + dXZ + eYZ + fZ^2 = P^T C P = 0 \qquad (1)$$

where $P = [X, Y, Z]^T$ and C is a real symmetrical matrix of the image ellipse. One obtains C at the image processing step after extracting the contour points. These points can be in millimeters.

From C, the three eigenvalues $\lambda_1$, $\lambda_2$, $\lambda_3$ and the corresponding eigenvectors $e_1$, $e_2$, $e_3$ are calculated. From the eigenvalues, one can obtain the two angular values for the orientation $\theta$:

$$\theta = \pm \arctan \sqrt{\frac{\lambda_2 - \lambda_1}{\lambda_3 - \lambda_2}} \,. \qquad (2)$$

Then one computes the rotation matrix $$R = [e_1 \mid e_2 \mid e_3] \begin{bmatrix} \cos\theta & 0 & \sin\theta \\ 0 & 1 & 0 \\ -\sin\theta & 0 & \cos\theta \end{bmatrix}. \qquad (3)$$

Finally the third column of the rotation matrix is parallel to the reference target normal. One thus obtains an ambiguity on the orientation of the normal vector. Moreover, the distance between the center of projection and the target is not known at this stage. Since the size of the target is known, it is possible to estimate this distance from the ellipse equation. Nevertheless, the estimate is less accurate than a measurement based on two separate cameras along a baseline.

Figure 5:
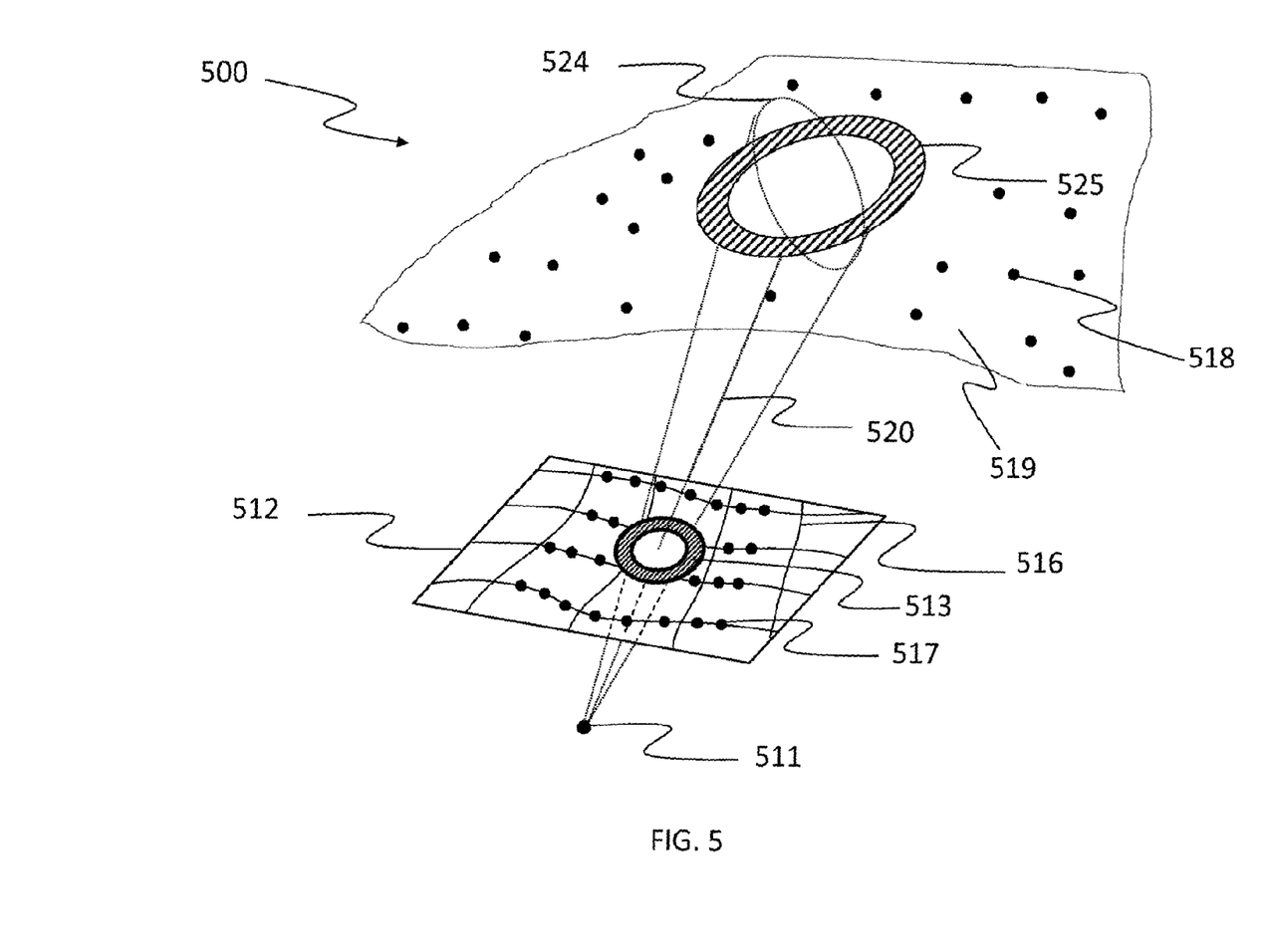
FIG. 5 is the image of FIG. 4 further including the location of 2D surface points.

In order to remove the ambiguity on the orientation and obtain a more accurate measurement of the distance to the target, one can use the baseline distance between the projector and the camera. However, no direct triangulation can be applied since the projector is not a sensor. The solution 500 is depicted in FIG. 5. The image plane 512 and the center of projection 511 are shown. The image plane 512 shows the image of the observed surface with the projected pattern 516 and the reference target 513. From the projected pattern 516, surface points 517 can be identified in the camera image plane 512 and matched to the projector using either temporal or spatial coding approaches described above. Moreover, since the camera-projector pair of devices can be calibrated for their intrinsic and extrinsic parameters, triangulation can be applied for the surface points. There are several methods in the art for calibrating a camera-projector pair. Then, one extracts points around the identified target and within a distance that is typically less than twice the size of the ellipse.

Based on the calibrated camera-projector pair, the 3D coordinates of these points are calculated in the sensor coordinate system. The points extracted around the identified target are therefore positioned in 3D 518. A local surface patch 519 can then be fitted in 3D before computing the normal vector at the interpolated position of the target. This interpolated position is located at or near the intersection of a ray 520 originating from the center of projection of the camera and passing through the center of the image ellipse and finally intersecting the fitted surface section. Precision is improved by using the actual axis of the cone and the interpolated position is therefore an approximation.

The model that is fitted to the local set of 3D points can be a plane or a second order polynomial for more precision. In this latter case, a least squares method is applied with the following model:

$$z = ax^2 + bxy + cy^2 + dx + ey + f \quad (4)$$

It is clear that other surface models can be used as well. From the parameters of the fitted model, the coordinates of the reference target center are calculated at the intersection of the ray 520 with the fitted surface and one of the two orientations calculated with the image ellipse in equation 2, is selected based on its smallest difference with the fitted surface normal. The selected orientation 525 and the rejected orientation 524 are shown in FIG. 5.

Then, the coordinates (x,y,z) of the target center can be refined. To do so, a local search is performed where the target center coordinates (x,y,z) are constrained to the fitted local surface, after compensating for the target material thickness, and the orientation of the target is restrained to the one already determined. One can then define a homography between the target circle in 3D space and the corresponding observed ellipse in the image. Given the conic equation 1, there is a 3×3 homography matrix H that maps the target circle points to the image ellipse C:

$$P^T C P = P^T H^T C^* H P = 0 \quad (5)$$

In equation 5, C* is a 3×3 matrix representing the target circle in its own coordinate system, centered at (x,y,z) and with the computed orientation in the camera coordinate system. The homography H can be set from the rotation matrix R in equation 3 after taking the first two columns $R_1$ and $R_2$ and setting the third column to $X = [x\ y\ z]^T$:

$$(R_1 R_2 X)^T C^* (R_1 R_2 X) = C. \quad (6)$$

During optimization, the position X of the target is refined to minimize the distance between the predicted ellipse center with the observed ellipse center. Given the homography and the target circle matrix, the ellipse center can be predicted as follows:

$$s \begin{bmatrix} u_c \\ v_c \\ 1 \end{bmatrix} = (H^T C^* H)^{-1} \begin{bmatrix} 0 \\ 0 \\ 1 \end{bmatrix} \quad (7)$$

where $u_c$ and $v_c$ are the coordinates of the ellipse center in the normalized image plane.

To compare the predicted ellipse center value with the image ellipse center, the value of s is set to the focal length F, an intrinsic parameter of the camera that is determined at the calibration step. One then ends up with a set of 3D points measured in the sensor's coordinate system along with a set of reference targets including their coordinates and their orientations in the same coordinate system.

Figure 7:
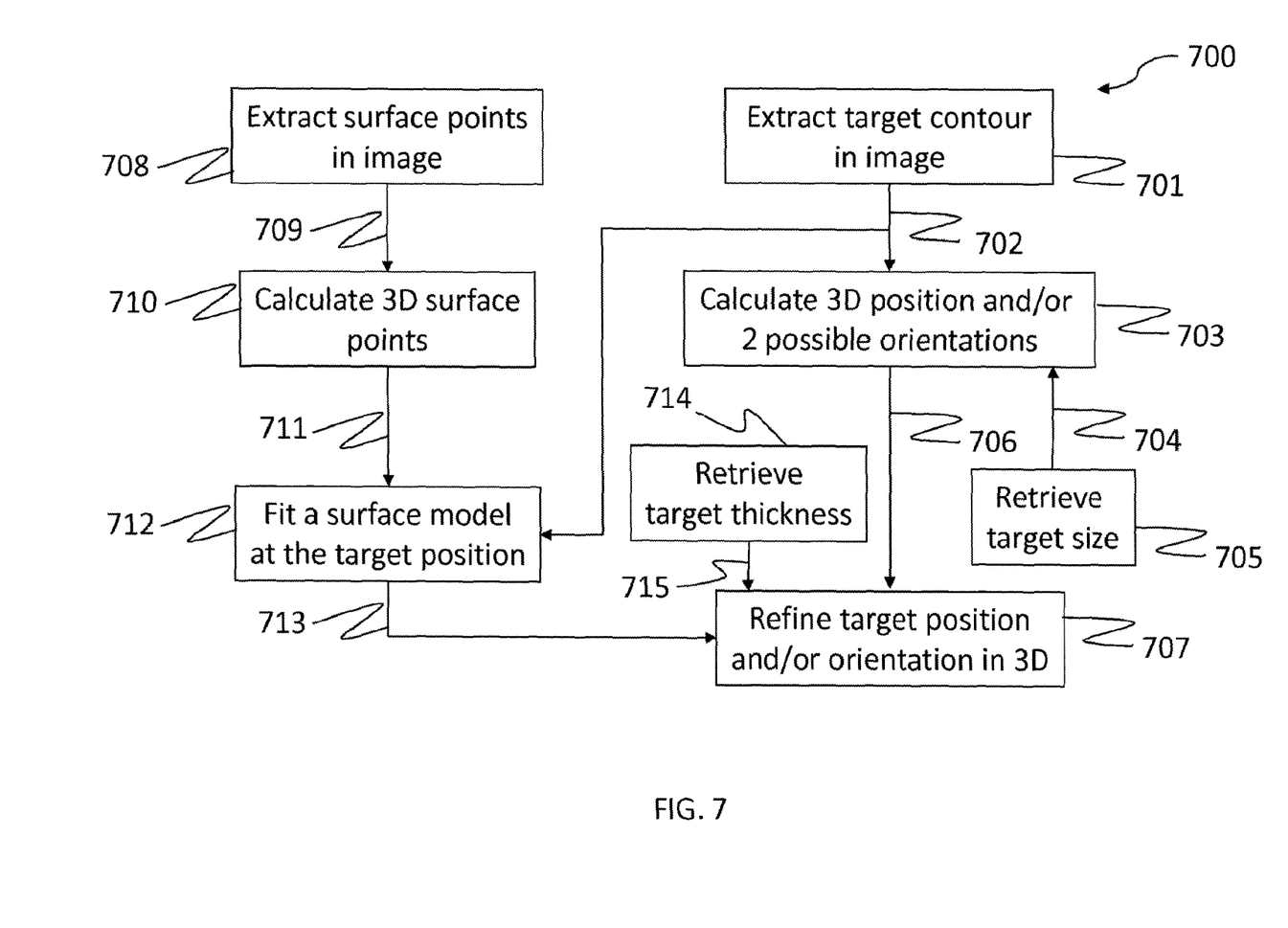
FIG. 7 is a flow chart of an example method for extracting a target in 3D.

FIG. 7 is a flowchart that summarizes the procedure 700 for extracting a target in 3D. The procedure can be applied to all targets in a given frame. The target contours are first extracted in the current image 701 and the extracted target contours 702 are used to calculate the two possible 3D orientations of the target as well as a first estimate of its 3D position 703. For calculating the 3D position, the target size 704 is provided from the target size storage 705. The 3D position and the two possible orientations 706 will be used to refine the target 3D position and identify the real orientation in 3D 707. For that purpose, the surface points are extracted in the image 708 at identified positions obtained from the projected pattern on the object surface. These image points 709 are then used to calculate 710 their corresponding 3D surface points 711. Using the extracted contour of the target 702, the 2D surface points that are around the target in the image are identified before fitting a surface section 712 on their 3D corresponding points. Finally, the fitted local surface model 713 along with the target thickness 715, in the target thickness storage 714, is used to refine the target position and identify the real orientation 707.

Figure 6:
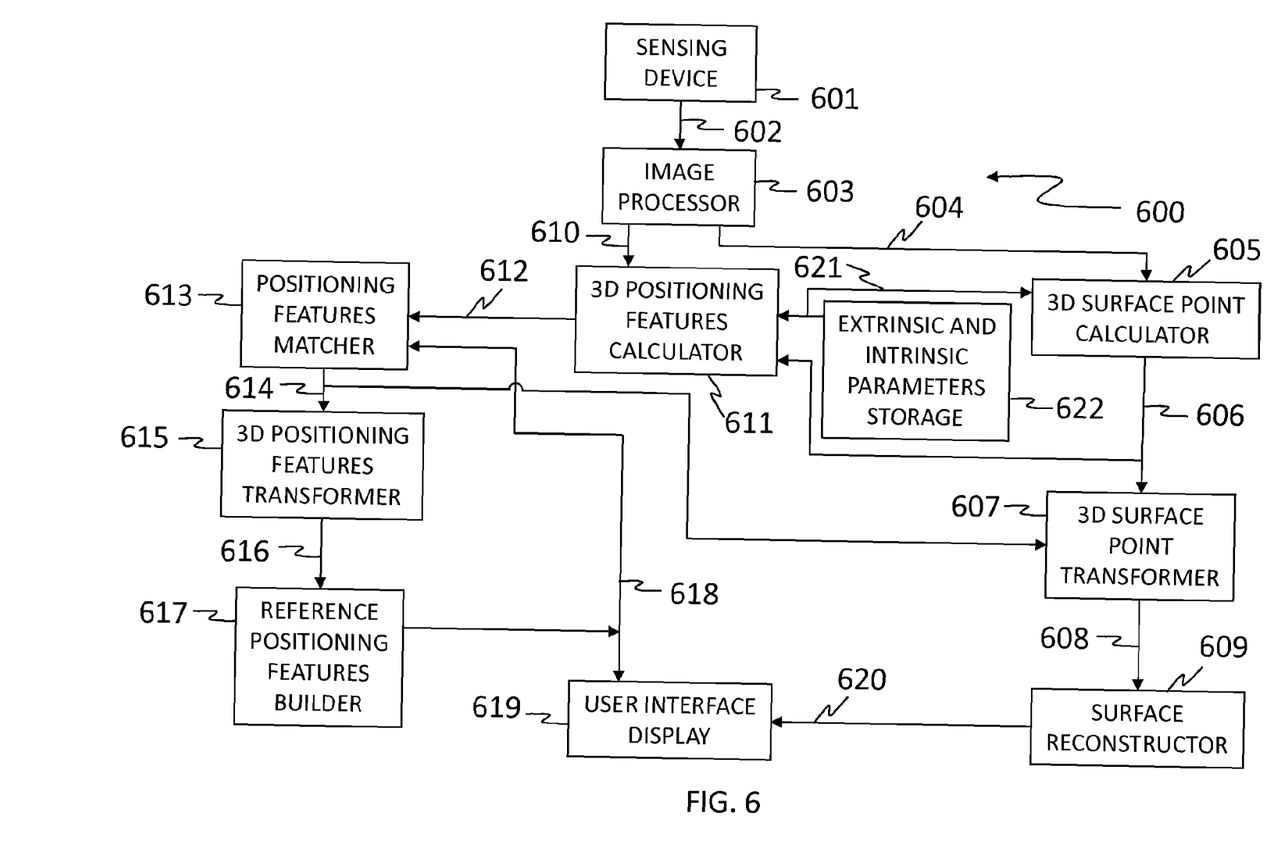
FIG. 6 is a block diagram of an example interactive 3D surface modeling system.

It is possible to exploit such a system in a 3D surface modeling engine. In FIG. 6, a block diagram 600 of an example 3D modeling engine is shown. Sensor 601 captures one or several images from a given viewpoint. Several images are necessary for temporal coding of the projected pattern. It is possible for a user to hold either the object or the sensor in his hands during acquisition. The object or the sensor do not need to be kept stationary during acquisition. One shot full-field pattern with spatial, and/or spectral coding makes handheld modeling possible. For one shot systems, the exposure time is typically less than a few milliseconds thus allowing hand motion during acquisition. Images 602 are then transferred to image processor 603 in which the projected pattern is decoded to extract observed surface points and the reference target contours are extracted.

From image processor 603, 2D image coordinates of observed surface points 604 are transferred to 3D surface point calculator 605. 3D surface point calculator 605 calculates the 3D coordinates of the surface points from their 2D image coordinates and from the extrinsic and intrinsic parameters 621 of the camera and projector. Parameters 621 can be stored in a memory 622 accessible by 3D surface point calculator 605. It will be apparent that a non-parametric model of calibration, for example in the form of look-up tables, can also be used and stored in memory 622. The sets of calculated 3D points in the sensor coordinate system 606 are transferred to 3D surface point transformer 607. 3D surface point transformer 607 also needs parameters 614 of the six degrees of freedom of the rigid transformation that maps the coordinate system of the sensor to the model coordinate system.

Image processor 603 also extracts the set of 2D image coordinates of the ellipse contours 610 that correspond to the observed reference targets. These contours 610 are transferred to 3D positioning features calculator 611 that also takes the set of 3D surface points 606 observed in the current image frame. The 3D positions 612, and optionally the orientations, of the reference targets are calculated in the sensor's coordinate system and transferred to positioning features matcher 613. Positioning features matcher 613 matches the reference targets observed in the current sensor frame with the same targets in the accumulated model frame and produces the rigid transformation 614 that maps the coordinate system of the sensor to the model coordinate system.

Transformation 614 is then used by 3D positioning features transformer 615 and 3D surface point transformer 607. 3D positioning features transformer 615 and 3D surface point transformer 607 transform the 3D reference target positions, and optionally orientations, and the 3D surface points from the sensor's coordinate system to the model coordinate system respectively. The transformed 3D reference target positions 616, and optionally orientations, are then used by reference positioning features builder 617 to update the accumulated model of observed reference targets. The updated model 618 is communicated to the positioning features matcher 613 for processing information extracted in the next frames. The updated model 618 is also communicated to the user interface display 619 to allow visualizing the accumulated model of reference targets.

The rigid transformation 614 that maps the coordinate system of the sensor to the model coordinate system is also transferred to 3D surface point transformer 607 to transform the 3D surface points from the sensor's coordinate system to the surface model's coordinate system. These transformed surface points 608 are then transferred to surface reconstructor 609 for producing a surface model from the acquired set of points. Finally the reconstructed surface 620 is communicated to user interface display 619 for display purposes.

The person skilled in the art will understand that one can use additional cameras. These cameras can be used to capture other characteristics such as the texture of the surface.

The additional camera can be made to capture the second 2D image after the camera has captured the 2D image and when the projected pattern is not apparent on the surface. If the second 2D image is captured immediately before or after the capture of the 2D image, the system may not have moved substantially in between the two captures. If one wishes to take into account the possible displacement of the sensing device, a compensation can be calculated for the theoretical displacement of the sensing device in the time delay between the capture of the two images.

The sensing device can include a synchronizing unit in communication with the camera, the additional camera and the pattern projector. The synchronizing unit controls the first camera and the pattern projector to capture the first 2D image during a first time interval and controls the second camera and the pattern projector to capture the second 2D image during a second time interval. The two time intervals are distinct. The synchronizing unit can control the pattern projector to provide the projected pattern during the first time interval and can prevent the pattern projector from providing the projected pattern during the second time interval.

If the additional camera is a texture camera, the second 2D image is a 2D texture image of the surface and the system further comprises a texture extractor for extracting a texture of the surface at the 2D image coordinates of surface points to obtain texture information for the surface point.

Although the above description relates to example embodiments as presently contemplated by the inventors, it will be understood that the invention in its broad aspect includes equivalents of the elements described herein.

The embodiments described above are intended to be exemplary only. The scope of the invention is therefore intended to be limited solely by the appended claims.

We claim:

1. A system for obtaining three-dimensional information about a surface having a set of at least one reference target, each reference target being provided at a fixed position one of on an environment of said surface and on said surface, said system comprising:
   a sensing device having:
      a pattern projector for providing a projected pattern on said surface;
      a camera for acquiring a 2D image of said surface from a viewpoint, said camera cooperating with said pattern projector, wherein at least one target of said set of reference targets and at least a portion of said projected pattern is apparent on said 2D image;
   a storage for calibration data, said calibration data including extrinsic and intrinsic parameters of said camera and said pattern projector;
   an image processor for extracting 2D image coordinates of surface points of the projected pattern and target contours from said 2D image;
   a 3D surface point calculator for calculating 3D coordinates of the surface points from said 2D image coordinates of said surface points using said calibration data;
   a 3D target calculator for calculating, from said 2D image coordinates of said target contours, using said 3D coordinates of the surface points and said calibration data, at least one of a 3D position and an actual orientation for said reference target;
   said system being adapted to perform the steps of:
      identifying neighboring surface points located around said target;
      calculating 3D coordinates of the neighboring surface points;
      fitting a surface section model on said 3D coordinates of said neighboring surface points; and
      at least one of: refining an estimated 3D position into the 3D position; and identifying the actual orientation of said target.

2. The system as claimed in claim 1, wherein said reference target is a retro-reflective target, wherein said sensing device further comprises a light source for illuminating said surface, said camera cooperating with said light source.

3. The system as claimed in claim 2, wherein said light source is a ring light source surrounding said camera.

4. The system as claimed in claim 3, wherein said ring light source has at least two Light Emitting Diodes (LED).

5. The system as claimed in claim 1, wherein said pattern projector is one of a laser pattern projector and a wideband pattern projector.

6. The system as claimed in claim 1, wherein said pattern projector and said camera are synchronized to simultaneously provide said projected pattern and acquire said 2D image by said camera.

7. The system as claimed in claim 1, further comprising:
   a target model storage for storing a model of targets of said surface;
   a target matcher for matching said target with a same target in said model of targets and generating a rigid transformation mapping a coordinate system of the sensing device to a coordinate system of said target model.

8. The system as claimed in claim 7, further comprising:
   a target transformer for transforming said 3D position for said reference target into a transformed 3D position for said reference target using said rigid transformation;

a target model builder for updating said model of targets in said target model storage using said transformed 3D position for said reference target.

9. The system as claimed in claim 7, further comprising:
a surface point transformer for transforming said 3D coordinates of said surface points into transformed 3D coordinates of said surface points using said rigid transformation;
a surface reconstructor for producing a surface model of said surface using said transformed 3D coordinates of said surface points.

10. The system as claimed in claim 9, further comprising:
a user interface display for displaying at least one of said surface model of said surface and said model of targets.

11. The system as claimed in claim 1, wherein said sensing device is adapted to be displaced to a plurality of distinct viewpoints and wherein said camera acquires said 2D image at each viewpoint of said plurality of viewpoints and wherein said 3D surface point calculator and said 3D target calculator use 2D image coordinates from at least two of said 2D images.

12. The system as claimed in claim 1, wherein said camera acquires at least two of said 2D image at said viewpoint and wherein said 3D surface point calculator and said 3D target calculator use 2D image coordinates from at least two of said 2D images.

13. The system as claimed in claim 1, wherein said sensing device is adapted to be displaced to a plurality of distinct viewpoints and wherein said camera acquires at least two of said 2D image at each viewpoint of said plurality of viewpoints and wherein said 3D surface point calculator and said 3D target calculator use 2D image coordinates from at least two of said 2D image.

14. The system as claimed in claim 1, wherein said camera is a first camera and wherein said 2D image is a first 2D image; and wherein said sensing device further comprises a second camera for acquiring a second 2D image of said surface, said second camera cooperating with said first camera, a spatial relationship between said first camera and said second camera being known, wherein said calibration data includes extrinsic and intrinsic parameters of said second camera.

15. The system as claimed in claim 14, wherein said sensing device further comprises a synchronizing unit in communication with said first camera, said second camera and said pattern projector, said synchronizing unit controlling said first camera and said pattern projector to capture said first 2D image during a first time interval and controlling said second camera and said pattern projector to capture said second 2D image during a second time interval; wherein said first time interval is distinct from said second time interval.

16. The system as claimed in claim 15, wherein said synchronizing unit controls said pattern projector to provide said projected pattern during said first time interval and prevents said pattern projector from providing said projected pattern during said second time interval.

17. The system as claimed in claim 14, wherein said second camera is a texture camera, said second 2D image being a 2D texture image of said surface, said system further comprising a texture extractor for extracting a texture of said surface at said 2D image coordinates of surface points to obtain texture information for said surface point.

18. A method for extracting a 3D position for a target affixed on a surface in a sensor coordinate system, a pattern being projected on said surface, comprising:
retrieving target information, said target information including a target size;
retrieving calibration data, said calibration data including extrinsic and intrinsic parameters;
providing a 2D image of said surface, wherein said target and at least a portion of said projected pattern being apparent on said 2D image;
extracting 2D image coordinates of target contours of said target from said 2D image;
calculating at least one possible orientation for said target using said 2D image coordinates of target contours and said calibration data;
estimating an estimated 3D position for said target in said sensor coordinate system using said 2D image coordinates of said target contours, said calibration data and said target size;
extracting 2D image coordinates of surface points of the projected pattern from said 2D image;
identifying neighboring surface points located around said target using said 2D image coordinates of said target contours;
calculating 3D coordinates of the neighboring surface points in said sensor coordinate system from said 2D image coordinates of said surface points using said calibration data;
fitting a surface section model on said 3D coordinates of said neighboring surface points in said sensor coordinate system;
using said fitted surface section model and said at least one possible orientation, at least one of refining said estimated 3D position into a refined 3D position in said sensor coordinate system and identifying an actual orientation for said target.

19. The method as claimed in claim 18, wherein
said target information includes a target thickness;
said refining said estimated 3D position includes using said target thickness for said refining.

20. The system as claimed in claim 1, wherein said 3D target calculator is adapted to perform the step of refining the estimated 3D position using a target thickness.

* * * * *